US 6,648,355 B2

(12) United States Patent
Ridenhour

(10) Patent No.: US 6,648,355 B2
(45) Date of Patent: Nov. 18, 2003

(54) STEP DRIVEN BICYCLE APPARATUS

(76) Inventor: Craig S. Ridenhour, 8839 W. Sahuaro Dr., Peoria, AZ (US) 85345

( * ) Notice: Subject to any disclaimer, the term of this patent is extended or adjusted under 35 U.S.C. 154(b) by 0 days.

(21) Appl. No.: 10/118,695

(22) Filed: Apr. 10, 2002

(65) Prior Publication Data

US 2003/0193159 A1 Oct. 16, 2003

(51) Int. Cl.$^7$ ................................ B62M 1/04
(52) U.S. Cl. ........................ 280/255; 280/251
(58) Field of Search ................. 280/251, 252, 280/253, 255, 258

(56) References Cited

U.S. PATENT DOCUMENTS

| | | | | |
|---|---|---|---|---|
| 1,632,308 A | * | 6/1927 | Mourer | 280/221 |
| 5,121,654 A | * | 6/1992 | Fasce | 74/594.2 |
| 5,242,181 A | * | 9/1993 | Fales et al. | 280/251 |
| 5,368,321 A | * | 11/1994 | Berman et al. | 280/221 |
| 6,173,981 B1 | * | 1/2001 | Coleman | 280/253 |
| 6,402,173 B1 | * | 6/2002 | Chiu | 280/252 |

FOREIGN PATENT DOCUMENTS

GB 2241476 A * 9/1991 ............ B62K/15/00

* cited by examiner

Primary Examiner—Kevin Hurley
(74) Attorney, Agent, or Firm—H. Gordon Shields

(57) ABSTRACT

Step pedal apparatus includes a pair of step pedals pivotally connected to a frame. The frame supports a front wheel and a rear drive wheel. The step pedals are coupled to a shaft for rotating the shaft on their downward pivoting through a pair of one way clutches. The step pedals operate independently of each other. The shaft is disposed between the step pedals and the rear wheel and is coupled to the rear wheel by a chain and a pair of sprockets. One sprocket is secured to and rotatable with the shaft and the other sprocket is coupled to the rear drive wheel. The step pedals are stabilized by a pair of arms coupled respectively to the step pedals and to the frame. The step pedals are independently coupled to the clutches by chains or cables extending between the frame and the clutches and rotate the clutches in response to the downward pivoting of the step pedals. A convex configuration of tracks in which the chains or cables move in response to the downward pivoting movement of the pedals provides smooth power strokes to the one way clutches.

22 Claims, 4 Drawing Sheets

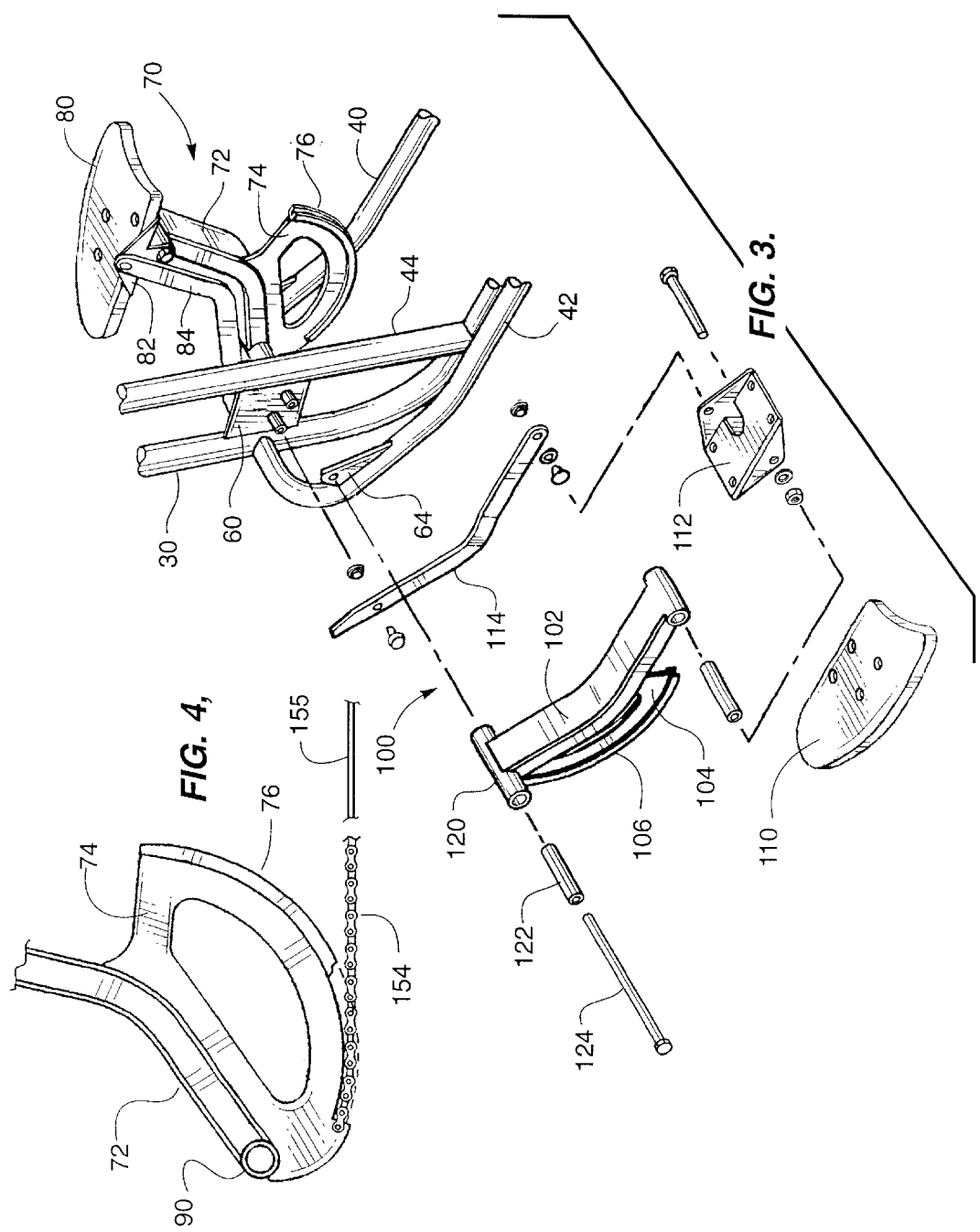

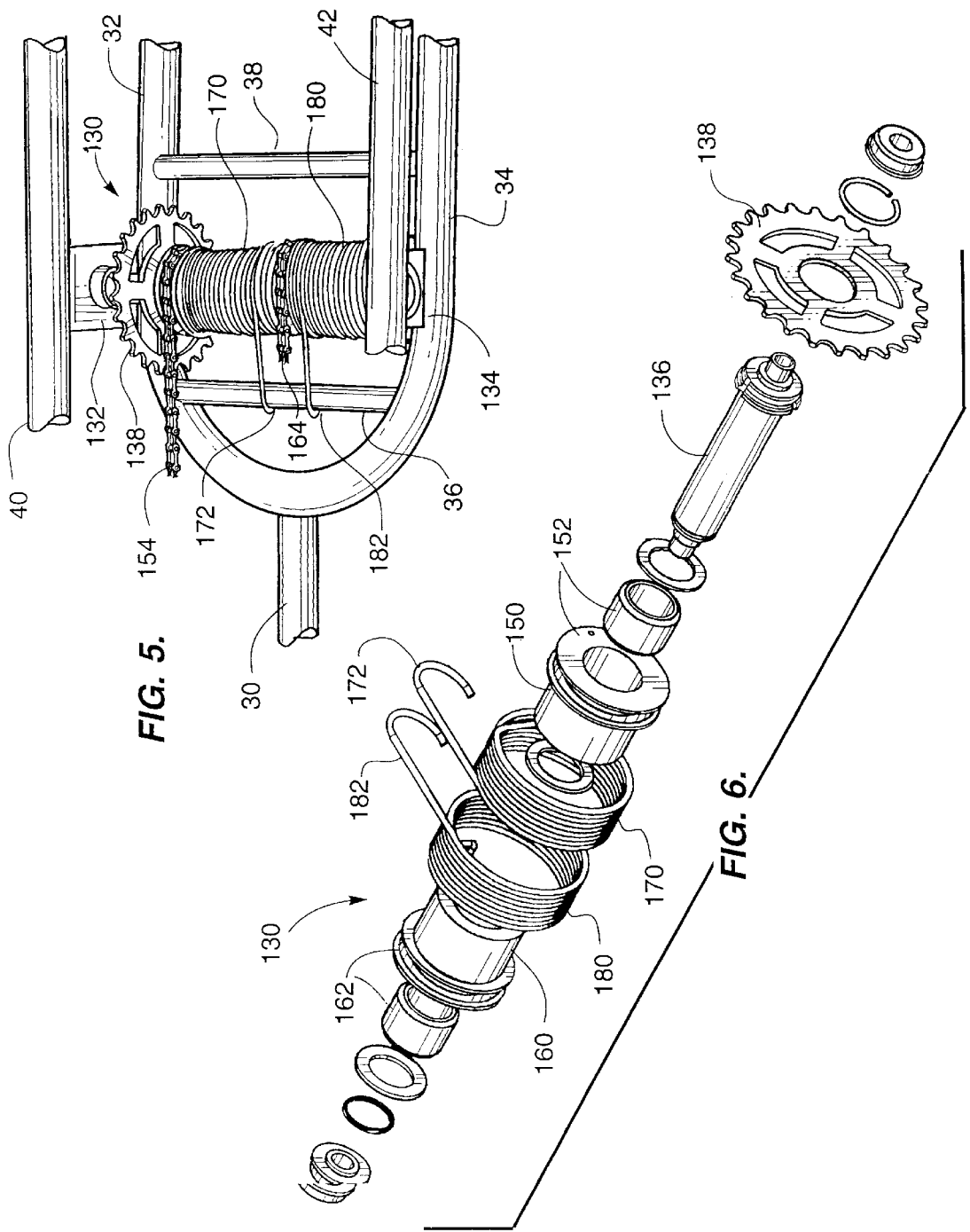

STEP DRIVEN BICYCLE APPARATUS

BACKGROUND OF THE INVENTION

1. Field of the Invention

This invention relates to bicycles, and more particularly, to step driven bicycles.

2. Description of the Prior Art

Step driven bicycles are among the earliest types of bicycles. A bicycle rider either sits or stands and pushes against a pair of pivoted step elements to provide motive power. The step elements of the prior art are typically alternately pivoted. One step goes down while the other step comes up. Power is provided on the down stroke or step.

An example of early prior art include U.S. Pat. No. 1,072,284 (Widera), in which step pedals are connected to a pair of drums by ratchet gear elements. The drums are in turn connected to a pair of drive wheels.

Another example of early prior art is found in U.S. Pat. No. 1,258,391 (Bried). Step elements are pivotly connected to the front of a bicycle frame and are connected to a chain and sprocket system. The chain and sprocket system is in turn connected through a rachet drive to a drive wheel. The pedals or treadles operate independently of each other.

Another early prior art apparatus is shown in U.S. Pat. No. 1,440,372 (Brown et al). A pair of pedals is pivotally connected to the front frame of a tricycle and a ratchet gear system connects the pedals to a pair of drive wheels.

U.S. Pat. No. 1,477,346 (Gedeon) discloses atricycle apparatus with a ratchet step drive.

U. S. Pat. No. 1,447,544 (D'Antonio) discloses a two wheel unit which includes a pedal and crank system connected to a drive sprocket, and a chain connects the drive sprocket to a driven sprocket on the rear wheel.

U.S. Pat. No. 1,899,854 (Cooper) discloses the use of straps on pivoting pedals connected to pulleys. The pulleys are connected to a ratchet drive on hubs of a drive wheel.

U.S. Pat. No. 2,053,835 (Kimball et al) discloses a single pivoting pedal with a link connected to a pivoting lever, and a chain connected to the lower end of the pivoting lever. The chain is in turn connected to a drive pulley. The drive pulley is connected through a clutch system to the rear drive wheel of the apparatus.

U.S. Pat. No. 5,192,089 (Taylor) discloses a cable and chain drive for a single pedal. The chain moves a sprocket on a hub connected to the drive wheel axle. Like most of the preceding, and following, patents, a clutch assembly is used for one way transmission of power.

U.S. Pat. No. 5,520,401 (Mohseni) discloses a pair of step pedals disposed on opposite sides of a frame, with a rear driving wheel secured to the frame. The operator straddles the frame and operates the pedals. The pedals are connected to a belt drive which extend over a pulley system. The pulley system is connected to a hub on a rear drive wheel axle. The pulleys on the rear drive wheel axle move laterally on splines to transfer power to the hub. The step pedals alternate up and down.

U.S. Pat. No. 5,368,321 (Berman et al) discloses a cable and chain drive system with a pair of alternating up and down step pedals. The step pedals are on the outside of a bicycle frame. The chain is disposed on sprockets on a front drive shaft. A separate chain is disposed about a drive sprocket on the drive shaft and about a sprocket on a rear drive shaft. Clutches on the front drive shaft allow the pedals to move upwardly and downwardly alternately.

GB Pat. No. 2 241 476 (Huang) discloses a pedal assembly which include drive bars connected to drive chains disposed in chain holders. The drive bars are disposed at an acute angle to the chain holders. The chains are fixed in the chain holders and are disposed against sprockets connected to a drive shaft. The sprockets are connected to the drive shaft through a clutch assembly. For reverse movement of the apparatus, the pedal assembly is moved upwardly to disengage the chains from the sprockets.

SUMMARY OF THE INVENTION

The apparatus disclosed and claimed herein comprises a step pedal bicycle having a pair of independently movable step pedals connected to a drive shaft. The step pedals include chain tracks in which chains are disposed. The chains are connected to sprockets secured to the drive shaft. The drive shaft includes one way clutches to connect the sprockets for moving the drive shaft in the desired direction to move the bicycle forward. A sprocket on the drive shaft is connected to the rear drive wheel by a chain. The step pedals are independently actuable, and may be moved alternately, together, or singly.

Among the objects of the present invention are the following:

To provide new and useful bicycle apparatus;

To provide new and useful step pedal bicycle apparatus;

To provide new and useful step pedal bicycle having a pair of independently actuable step pedals;

To provide new and useful step pedal bicycle apparatus having a chain drive; and To provide new and useful bicycle apparatus having a chain drive using a pair of chains fixed at one end to step pedals and fixed at the opposite end to a drive shaft.

BRIEF DESCRIPTION OF THE DRAWING

FIG. 3 is an enlarged exploded perspective view of a portion of the apparatus of FIG. 2.

FIG. 4 is an enlarged side view, partially broken away, of a portion of the apparatus of FIG. 3.

FIG. 5 is an enlarged perspective view of another portion of the apparatus of the present invention.

FIG. 6 is an exploded view of a portion of the apparatus of the FIG. 5 from a reverse perspective.

DESCRIPTION OF THE PREFERRED EMBODIMENT

Figure 1:
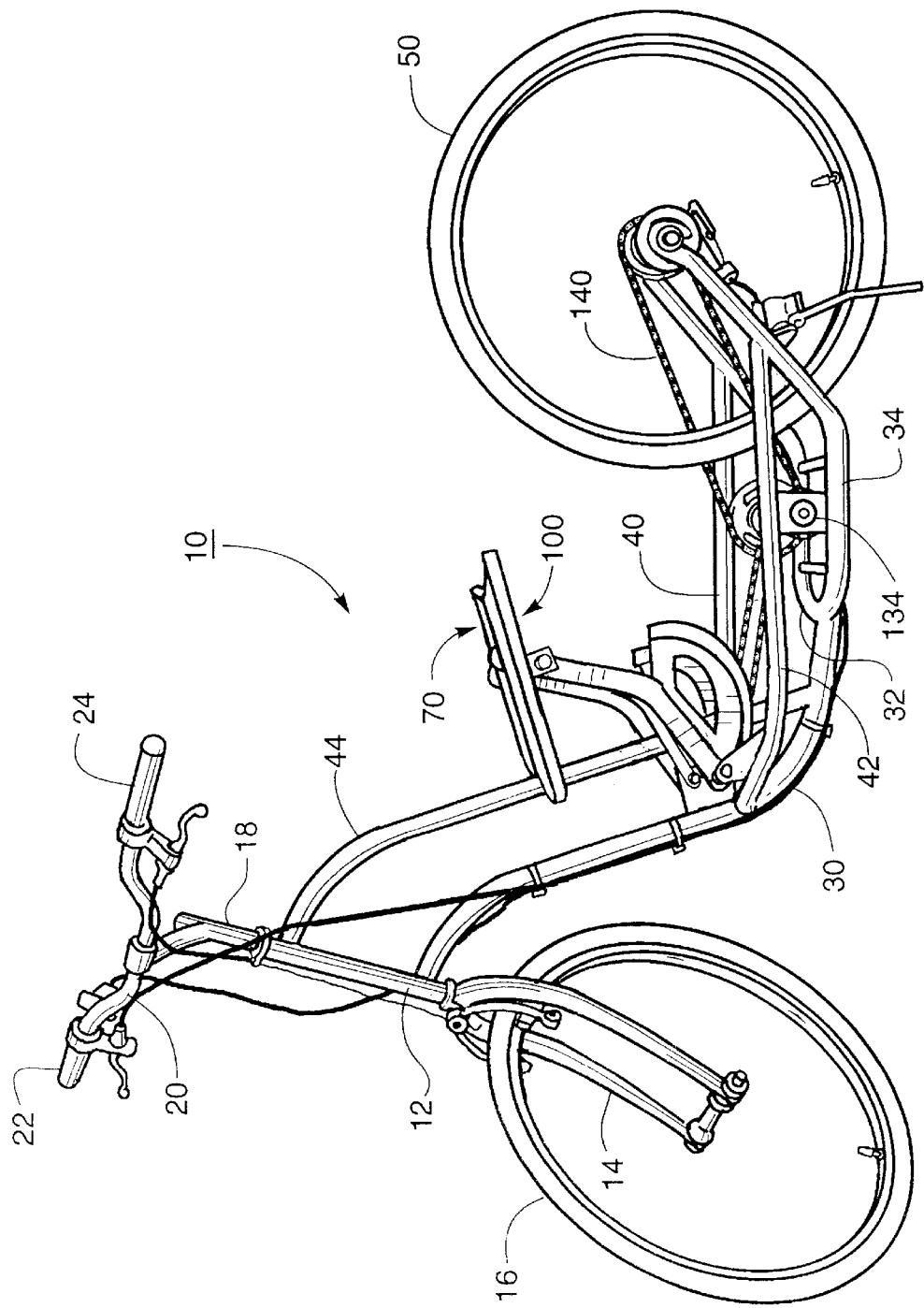
FIG. 1 is a side view of a bicycle of the present invention.
Figure 2:
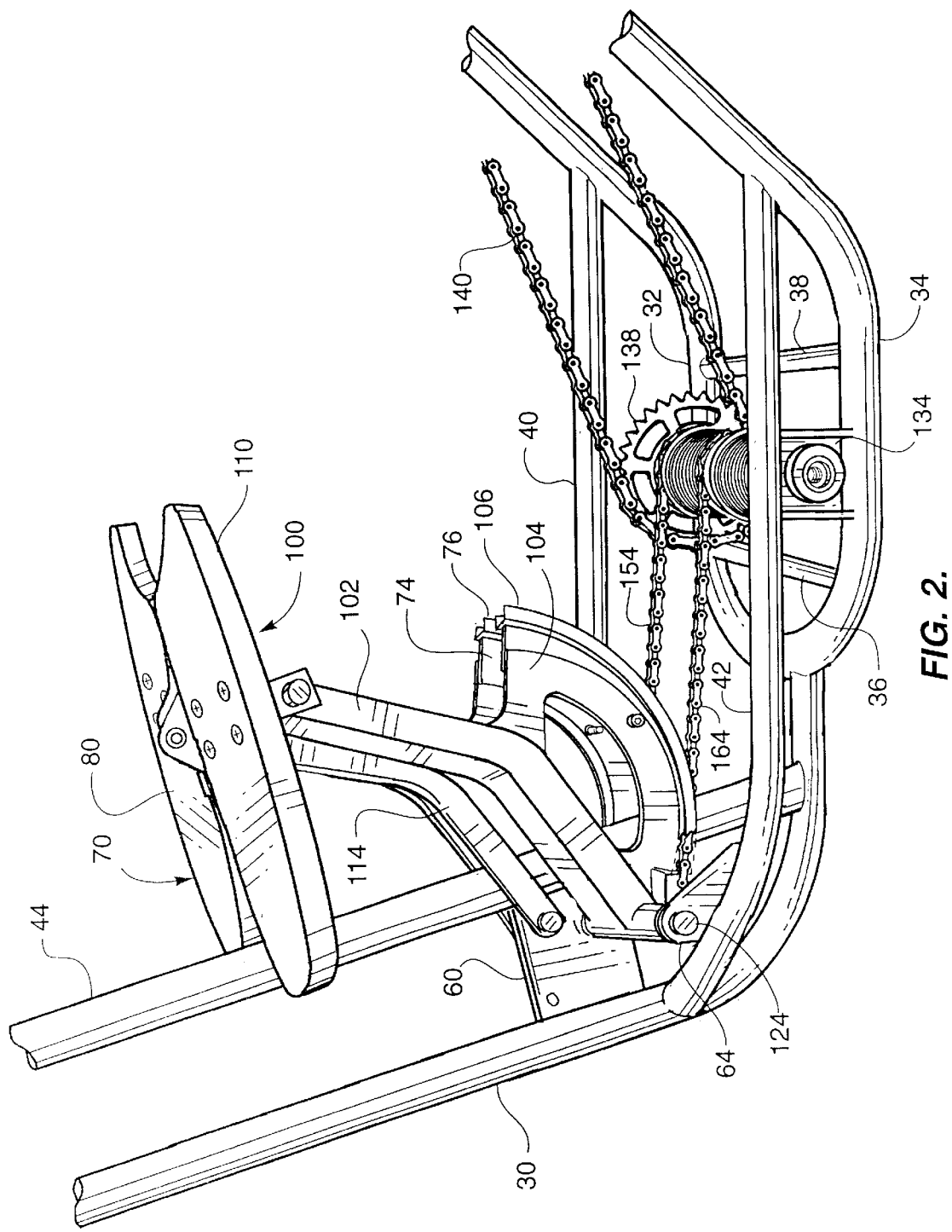
FIG. 2 is an enlarged perspective view of a portion of the apparatus of the present invention.

FIG. 1 is a side view of step bicycle apparatus 10 of the present invention. FIG. 2 is an enlarged view of a portion of the bicycle apparatus 10. For the following general discussion of the apparatus 10, reference will primarily be made to FIGS. 1 and 2.

The bicycle apparatus 10 includes a front frame member 12. Extending downwardly from the frame member 12 is a front fork member 14. A front wheel 16 is secured to the fork 14.

Extending upwardly from the frame member 12 is a neck 18. A handle bar 20 is secured to the neck 18. The handle bar 20 includes a right handlebar grip 22 and a left handlebar grip 24.

Extending downwardly and rearwardly from the front frame member 12 is a lower frame member 30. The lower frame member 30 curves downwardly and rearwardly and forks into a pair of arms 32 and 34. The arms 32 and 34 curve upwardly and provide support at their distal ends for a rear wheel 50. Slightly rearwardly from the frame member 30 there is a pair of lateral support elements or members 36 and 38 which extend between and are secured to the arms 32 and 34.

A lower side frame member 40 curves outwardly from the frame member 30 and extends to the arm 32. Another side frame member 42 curves outwardly from the frame member 30 and extends to the arm 34. An upper frame member 44 extends from the front frame member 12 generally parallel to the frame member 12 and connects to the frame member 30 at the lower portion of the frame member 30 a slight distance in front of where the arms 32 and 34 branch from the frame member 30.

A plate 60 extends between the frame members 30 and 44 adjacent to where the side frame members 40 and 42 extend from the frame member 30. A pair of step pedal assemblies 70 and 100 are pivotly secured to the plate 60. For the following discussion of the pedal assemblies and their associated elements, attention will be directed to FIGS. 3 and 4, in addition to FIGS. 1 and 2. FIG. 3 is an exploded perspective view of a portion of the frame members 30, 40, 42, and 44, showing the pedal assemblies 70 and 100 pivotly secured to the frame members, with the pedal assembly 100 shown exploded to illustrate the various elements associated therewith.

The pedal assembly 70 includes an angled bracket 72 which is pivotly secured to the plate 60. The bracket 72 includes two portions, the first of which extends rearwardly and upwardly from the plate 60 for a relatively short distance and then the second portion extends upwardly at a greater angle than the first portion and slightly rearwardly. At the distal end of the bracket 72, remote from the plate 60, a pedal 80 is secured to the bracket 72 at or through a bracket 82. The bracket 82 is thus secured to both the pedal 80 and the bracket 72, and is the element that secures the pedal 80, the arm 84, and the bracket 72 together.

A generally D shaped bracket 74 is secured to the underneath or bottom surface of the bracket 72. A chain track 76 is in turn secured to the D shaped bracket 74. The track 76 may be an integral part of the bracket 74, if desired. Similarly, the bracket 74 may be an integral part of the bracket 72, if desired. The chain track 76 and the outer configuration of the bracket 74 is generally convex. The convex configuration is best shown in FIG. 4, which is a side view of the bracket 74 and a portion of the bracket 72. The significance of the convex configuration will be discussed below.

A stabilizer arm 84 is also secured to the plate 82 and extends to the plate 60. The arm 84 pivots on the plate 60 along with the bracket 72 and its associated elements. The purpose of the arm 84 is to stabilize the pedal 80 as the pedal pivots. The arm 84 provides lateral stabilizing support for the pedal 80 and the bracket 72. Both the bracket 72 and the stabilizer arm 84 pivot on the plate 60 through a pin arrangement. The bracket 72 pivots one pin and the arm 84 pivots on another pin. The two pins are spaced apart a slight distance. The pivot pins and associated elements are best shown in FIG. 3 for the pedal assembly 100. The two pedal assemblies 70 and 100 are substantially identical to each other, and are mirror images of each other.

The pedal assembly 100 extends between the plate 60 and a plate 64. The plate 64 is secured to the frame member 42. A similar plate is secured to the frame member 40 for the pedal assembly 70.

The pedal assembly 100 includes an angled bracket 102 which is pivotally secured to the frame members 30 and 44 at the plate 60. The angled bracket 102 is generally parallel to the angled bracket 72. A generally D shaped bracket 104 is secured to the bottom surface of the angled bracket 102, and a chain track 106 is in turn secured to the lower portion of the D bracket 104. Again, the convex configuration is used for the track 106 and the bottom or lower portion of the bracket 104.

Finally, a step pedal 110 is secured to the upper portion or top of the angled bracket 102, remote from the pivot point of the bracket 102.

A bracket 112 is secured to the pedal 110 to secure the pedal 110 to the bracket 102, and a stabilizer arm 114 is pivotally secured to the bracket 112. The opposite end of the arm 114, remote from the pedal 110 is pivotally secured to the plate 60. The stabilizer arm 114 helps to stabilize the pedal 110 and its associated elements laterally as the pedal 110 pivots downwardly and then as it returns upwardly, just as the stabilizer arm 84 functions with respect to the pedal 80 and its associated elements.

The bracket 112, and also the bracket 82, includes four holes on the top of the bracket for receiving appropriate fastening elements to secure the pedal 110 and the bracket 112 together. Additional holes or apertures extend through the side plates or flanges of the bracket 112 for securing the bracket 112 to the bracket 102 and to the arm 114 by appropriate fastening elements. The bracket 82 is substantially identical to the bracket 112 in form and function.

The end of the bracket 102, remote from the pedal 110, includes a tube 120. Extending through the tube 120 is a bushing 122, and a pin 124 extends through the bushing 122 and the tube 120. The pin 124 also extends through an aperture in the plate 64 and through an aligned aperture and bushing in the plate 60. The pin 124 also extends through generally identical corresponding elements associated with the bracket 72. Both the pedal assembly 70 and the pedal assembly 100 pivot on the pin 124. In FIG. 4, a tube 90, similar to the tube 120, is shown for the bracket 72. The pin 124 extends through the tube 90 and its bushing, which corresponds to the bushing 122 shown in FIG. 3 for the bracket 102.

Also shown in FIG. 3, but not specifically identified, are various fastening elements and associated elements, such as washers and nuts, etc., well known and understood in the art of pivoting and fastening elements. Obviously, such elements are necessary for appropriately securing the various structural elements together.

The step pedals 80 and 110 and their associated elements provide motive power for the rear driving wheel 50 as they move downwardly on their respective power strokes. Power is transferred from the pedals through a power transfer assembly 130. The power transfer assembly 130 is shown in detail in FIGS. 5 and 6. FIG. 5 is a perspective view of a portion of the frame elements of the apparatus 10 to which the power transfer assembly is secured. FIG. 6 is an exploded perspective view of the power transfer assembly 130 from a reverse perspective from that shown in FIG. 5. For the following discussion, attention will primarily be directed to FIGS. 5 and 6, but reference may also be made to the other drawing figures.

The power transfer assembly 130 includes a pair of plates 132 and 134 which are secured respectively between the frame members 32,40 and 34,42. A power transfer shaft 136 is appropriately journalled for unidirectional rotation on the plates 132 and 134. A sprocket 138 is secured to the shaft 136. A drive chain 140 extends over the sprocket 138 and to and over a drive sprocket at the drive wheel 50 for rotating the wheel 50.

Power is transferred to the shaft 136 from the step pedals as they pivot through a pair of one way clutch assemblies 150 and 160. The clutch assembly 150 includes a pulley 152 and a chain 154. One end of the chain 154 is secured to the pulley 152, and the opposite end of the chain 154 is secured to the D bracket 74, as best shown in FIG. 4. The chain 154 is moved downwardly and forwardly to rotate the clutch assembly 150 in the counterclockwise direction as viewed in FIG. 2 as the pedal 80 is moved downwardly on its power stroke by a user. The chain 154 is disposed in the track 76 as it moves downwardly. As the clutch assembly 150 is moved in that counterclockwise direction, the clutch assembly is coupled to the shaft 136, and the sprocket 138 is accordingly moved counterclockwise to move the chain 140 to provide motive power to the rear wheel 50.

The convex configuration of the track 76 provides both a forward and downward movement of the chain 154 as the pedal assembly 70 pivots downwardly and forwardly on the power stroke or step. The downward and forward movement provides a smooth power stroke without a flat spot and provides maximum power from the assembly. Power will be transmitted regardless of the length of a particular stroke. That is, a user need not provide a full stroke in order to provide motive power to the rear drive wheel 50.

The clutch assembly 160 similarly includes a pulley 162 and a chain 164. One end of the chain 164 is secured to the pulley 162, and the opposite end of the chain 164 is secured to the D bracket 104. See FIG. 2. The chain 164 is disposed in the track 106 as the pedal 110 is moved downwardly on its power stroke. As the chain 164 moves downwardly and forwardly, it rotates the pulley 162 counterclockwise, as viewed in FIG. 2. In that counterclockwise direction, the clutch assembly 160 is coupled to the shaft 136 to rotate the shaft 136 and its sprocket 138, as discussed above.

Again, since both pedal assemblies are substantially identical to each other, the convex configuration of the track 104 provides the smooth power stroke, etc., discussed above.

At the bottom of the power strokes, the D brackets 74 and 104 are essentially nested within the frame members 30,40, and 42. The frame members 30, 40, and 42 essentially provide a protective cage for the chains and their associated elements. Note also, as best shown in FIG. 2, that the power assembly 130 is also protected by the respective frame members. The frame members 40 and 42 also comprise stop elements for the pedals 80 and 110 at the bottom of the power strokes of the respective pedals. As stop elements, the frame members 40 and 42 also comprise rest elements for a pedal or for both pedals. That is, when a user wants to coast, the user may "rest"by positioning one or both pedals against the respective frame members 40 and 42. Appropriate elements or bumpers (not shown) may be secured to the bottoms of the pedals 80 and 110 as shock absorbers, etc.

For returning the pedals 80 and 110 to their upward location, a pair of coil springs 170 and 180 are secured respectively to the clutch assemblies 150 and 160. The springs 170 and 180 include hook ends 172 and 182, respectively, which are secured to the frame member 36, as best shown in FIG. 5.

In the rest or static position of the step pedal assemblies, the chains 154 and 164 are wound on their respective pulleys. As the pedal assemblies pivot downwardly on their power strokes, the chains unwind from their pulleys, thus tensioning the springs 170 and 180 on their respective clutch assemblies.

As foot pressure by a user is lifted on the respective pedals 80 and 110, the coil springs 170 and 180, which are wound about their respective clutch assemblies, coil to rotate their respective clutch assemblies in a clockwise direction as viewed best in FIGS. 2 and 5. As the clutch assemblies rotate clockwise, the chains 154 and 164 rotate onto their respective pulleys of the clutch assemblies 150 and 160 to wind onto the clutch assemblies, thus shortening the chains. As the chains shorten with respect to the step pedal assemblies, the pedal assemblies pivot upwardly in preparation for their next downward power strokes. In the clockwise rotation of the clutch assemblies, the clutch assemblies are decoupled from the shaft 136, by the one way action of the clutches, thus allowing the shaft 136 to continue rotating counterclockwise on a power stroke or a continuation of a power stroke by one or the other of the step pedal assemblies.

Since the clutch assemblies 150 and 160 are independently coupled to the shaft 136, they are independently movable or actuable by the pedal assemblies. Thus, the pedal assemblies may be moved alternately or simultaneously, or either one may be moved singly while the other one may remain in a static situation. The movement downwardly and upwardly of the step pedals may be accomplished as desired by a user of the apparatus.

Returning again to FIG. 4, the chain 154 is shown secured to the bottom or lower portion of the D bracket 74. Also shown in FIG. 4 is a portion of a cable 155 aligned with the chain 154. Thus, while chains have been illustrated for coupling the step pedal assemblies to the clutch assemblies, cables may be used instead of the chains.

While the principles of the invention have been made clear in illustrative embodiments, without departing from those principles there may occur to those skilled in the art modifications of structure, arrangement, proportions, the elements, materials, and components used in the practice of the invention, and otherwise, which are particularly adapted to specific environments and operative requirements. The appended claims are intended to cover and embrace any and all such modifications within the limits only of the true spirit and scope of the invention.

What I claim is:

1. Step pedal bicycle apparatus comprising in combination:

frame means for supporting a pair of wheels, including a front wheel and a rear driving wheel;

first step pedal means pivotally secured to the frame means for providing motive power to the rear driving wheel including
  a first bracket pivotally secured to the frame means,
  a first chain track secured to the first bracket, and
  a first pedal secured to the first bracket for receiving a first foot of a user, second step pedal means pivotally secured to tile frame means for providing motive power to the rear driving wheel and disposed generally parallel to the first step pedal means, including
  a second bracket pivotally secured to the frame means,
  a second chain track secured to the second bracket, and
  a second pedal secured to the second bracket for receiving a second foot of a user;

means for transferring power from the first and second step pedal means to the rear driving wheel, including
  a shaft rotatingly secured to the frame means between the rear wheel and the first and second step pedal means, a first pulley for receiving a first chain for rotating the shaft, a second pulley for receiving a second chain for rotating the shaft, a first one way clutch coupled to the first pulley and to the shaft for rotating the shaft in response to rotation of the first pulley in a first direction and decoupled from the shaft in response to rotation of the first pulley in a second direction, a second one way clutch coupled to the second pulley and to the shaft for rotating the shaft in response to rotation of the second pulley in the first direction and decoupled from the shaft in response to rotation of tie second pulley in the second direction, and a first sprocket secured to the shaft and rotatable with the shaft;

a first chain secured to the first bracket and disposed in the first chain track and extending to the first pulley for rotating the first pulley and shaft in response to the downward pivoting of the first step pedal means;

a second chain secured to the second bracket and disposed in the second chain track and extending to the second pulley for rotating the second pulley and shaft in response to the downward pivoting of the second step pedal means;

a second sprocket secured to the driving wheel; and a first chain extending over the first and second sprockets for rotating the driving wheel in response to rotation of the shaft.

2. The apparatus of claim 1 in which the means for transferring power further includes spring means for pivoting the first and second step pedal means upwardly after they have been pivoted downwardly to provide motive power for rotating the driving wheel.

3. The apparatus of claim 2 in which the spring means includes a first return spring for the first step pedal means and a second return spring for the second step pedal means.

4. The apparatus of claim 1 in which the first and second chains are secured to the first and second pulleys for rotating the first and second pulleys in response to the downward pivoting of the first and second step pedal means.

5. The apparatus of claim 1 in which the first step pedal means further includes a first stabilizing arm pivotally secured to the first step pedal and to the frame means and a second stabilizing arm pivotally secured to the second step pedal and to the frame means for stabilizing the first and second step pedals as they pivot to provide power for rotating the driving wheel.

6. The apparatus of claim 1 in which the first and second brackets each include a generally convex configured portion.

7. The apparatus of claim 6 in which the first and second chain tracks are secured to the first and second brackets at the convex portions.

8. The apparatus of claim 1 in which the first and second chain tracks have a convex configuration for moving the first and second chains downwardly and forwardly as the first and second step pedal means pivot downwardly.

9. Step pedal bicycle apparatus comprising in combination:

frame means for supporting a front wheel and a rear drive wheel;

first step pedal means for rotating the rear drive wheel including a first step pedal, a first bracket secured to the first step pedal and pivotally secured to the frame means remote from the first step pedal, and a first stabilizing arm for stabilizing the first step pedal;

second step pedal means for rotating the rear drive wheel including a second step pedal, a second bracket secured to the first step pedal and pivotally secured to the frame means remote from the second step pedal and disposed generally parallel to the first step pedal means, and a second stabilizing arm for stabilizing the second step pedal;

a shaft rotatable on the frame means in response to the downward pivoting of the first and second step pedal means;

clutch means for rotating the shaft in response to the downward pivoting of the first and second step pedal means and decoupling the shaft in response to the upward pivoting of the first and second step pedal means, including first means for coupling the clutch means to the first step pedal means for rotating the shaft in response to the downward pivoting of the first step pedal means, and second means for coupling the clutch means to the second step pedal means for rotating the shaft in response to the downward pivoting of the second step pedal means;

first power transfer means for transferring power from the downward pivoting of the first step pedal means to the first means for coupling the clutch means to the shaft; and second power transfer means for transferring power from the downward pivoting of the second step pedal means to the second means for coupling the clutch means to the shaft.

10. The apparatus of claim 9 in which the first and second stabilizing arms are secured respectively to the first and second step pedals and to the frame means.

11. The apparatus of claim 9 in which the clutch means further includes spring means for pivoting the first and second step pedal means upwardly after their downward pivoting.

12. The apparatus of claim 9 in which the first and second means for coupling the clutch means to the first and second step pedal means includes first and second pulleys secured to the clutch means and cooperating with the first and second power transfer means for transferring power to the clutch means.

13. The apparatus of claim 12 in which the first and second power transfer means includes a first chain and a second chain secured respectivly to the first and second pulleys and to the first and second brackets for transferring power to the clutch means in response to the downward pivoting of the first and second step pedal means.

14. The apparatus of claim 12 in which the first and second power transfer means includes a first cable and a second cable secured respectively to the first and second pulleys and to the first and second brackets for transferring power to the clutch means in response to the downward pivoting of the first and second step pedal means.

15. The apparatus of claim 9 in which the first and second brackets each include a convex portion, and the first and second power transfer means are disposed against the convex portions as the first and second step pedal means pivot downwardly.

16. The apparatus of claim 15 in which the first and second power transfer means move downwardly and forwardly on the convex portion as the first and second step pedal means pivot downwardly.

17. The apparatus of claim 9 in which the first and second step pedal means are independent of each other in rotating the rear drive wheel.

18. Step pedal apparatus comprising in combination:
frame means for supporting a front wheel and a rear wheel;
first step pedal means for providing power to rotate the rear wheel, including
  a first bracket pivotly secured to the frame means and having a convex outer configuration, and
  a first step pedal secured to the first bracket remote from the frame means for pivoting the first step pedal means downwardly by a user;
second step pedal means for providing power to rotate the rear wheel, including
  a second bracket pivotly secured to the frame means generally parallel to the first bracket and having a convex outer configuration, and
  a second step pedal secured to the second bracket remote from the frame means for pivoting the second step pedal means downwardly by a user;
means for transferring power from the first and second step pedal means to the rear wheel in response to the downward pivoting of the first and second step pedal means, including
  a shaft rotatable on the frame means,
  a first one way clutch coupled to the shaft and to the first step pedal means for rotating the shaft in response to the downward pivoting of the first step pedal means,
  a second one way clutch coupled to the shaft and to the second step pedal means for rotating the shaft in response to the downward pivoting of the second step pedal means,
  first coupling means disposed on the conves outer configuration of the first bracket for coupling the first step pedal means to the first one way clutch,
  second coupling means disposed on the convex outer configuration of the second bracket for coupling the second step pedal means to the second one way clutch, and
  third coupling means for coupling the shaft to the rear wheel to rotate the rear wheel in response to the downward pivoting of the first and second step pedal means.

19. The apparatus of claim 18 in which the first and second step pedal means pivot independently on the frame means to provide power to rotate the rear wheel.

20. The apparatus of claim 18 in which the frame means includes a cage for protecting the means for transferring power from the first and second step pedal means to the rear wheel.

21. The apparatus of claim 18 in which the frame means includes stop elements for the first and second step pedals as the step pedals pivot downwardly.

22. The apparatus of claim 18 in which the frame means includes a first frame member and a second frame member disposed about the means for transferring power from the first and second step pedal means to the rear wheel and comprising stop and rest elements for the first and second step pedals as the first and second step pedals pivot downwardly.

* * * * *